United States Patent [19]

Watanabe

[11] Patent Number: 5,125,744
[45] Date of Patent: Jun. 30, 1992

[54] OPTICAL MEASUREMENT DEVICE

[75] Inventor: Masami Watanabe, Amagasaki, Japan

[73] Assignee: Mitsubishi Denki Kabushiki Kaisha, Japan

[21] Appl. No.: 645,593

[22] Filed: Jan. 24, 1991

[30] Foreign Application Priority Data

Apr. 25, 1990 [JP] Japan .................. 2-107477

[51] Int. Cl.⁵ .................................. G01B 11/00
[52] U.S. Cl. ........................ 356/372; 250/227.21; 250/231.1
[58] Field of Search .............. 356/372, 364, 365; 250/227.21, 231.1, 231.19, 225; 324/96

[56] References Cited
FOREIGN PATENT DOCUMENTS 61-125783 7/1986 Japan.

OTHER PUBLICATIONS

"Optical Fiber Sensor Technical Materials," The First International Corporation, pp. 310-311 Aug. 19, 1983.

Primary Examiner—F. L. Evans
Attorney, Agent, or Firm—Wolf, Greenfield & Sacks

[57] ABSTRACT

An optical measuring apparatus for measuring physical quantity which has a frequency by applying an optical sensor which modulates intensity of the light according to the physical quantity, wherein malfunctions in the apparatus itself, concretely, in a condenser, an AC amplifier and a divider as well as in an optical transmitter, an optical fiber, an optical sensor, an optical receiver and a DC amplifier can be self-checked by superimposing an AC of a frequency higher than the frequency of the physical quantity on a driving current of the optical transmitter and monitoring the components of a signal of a frequency higher than a frequency of the physical quantity.

15 Claims, 2 Drawing Sheets

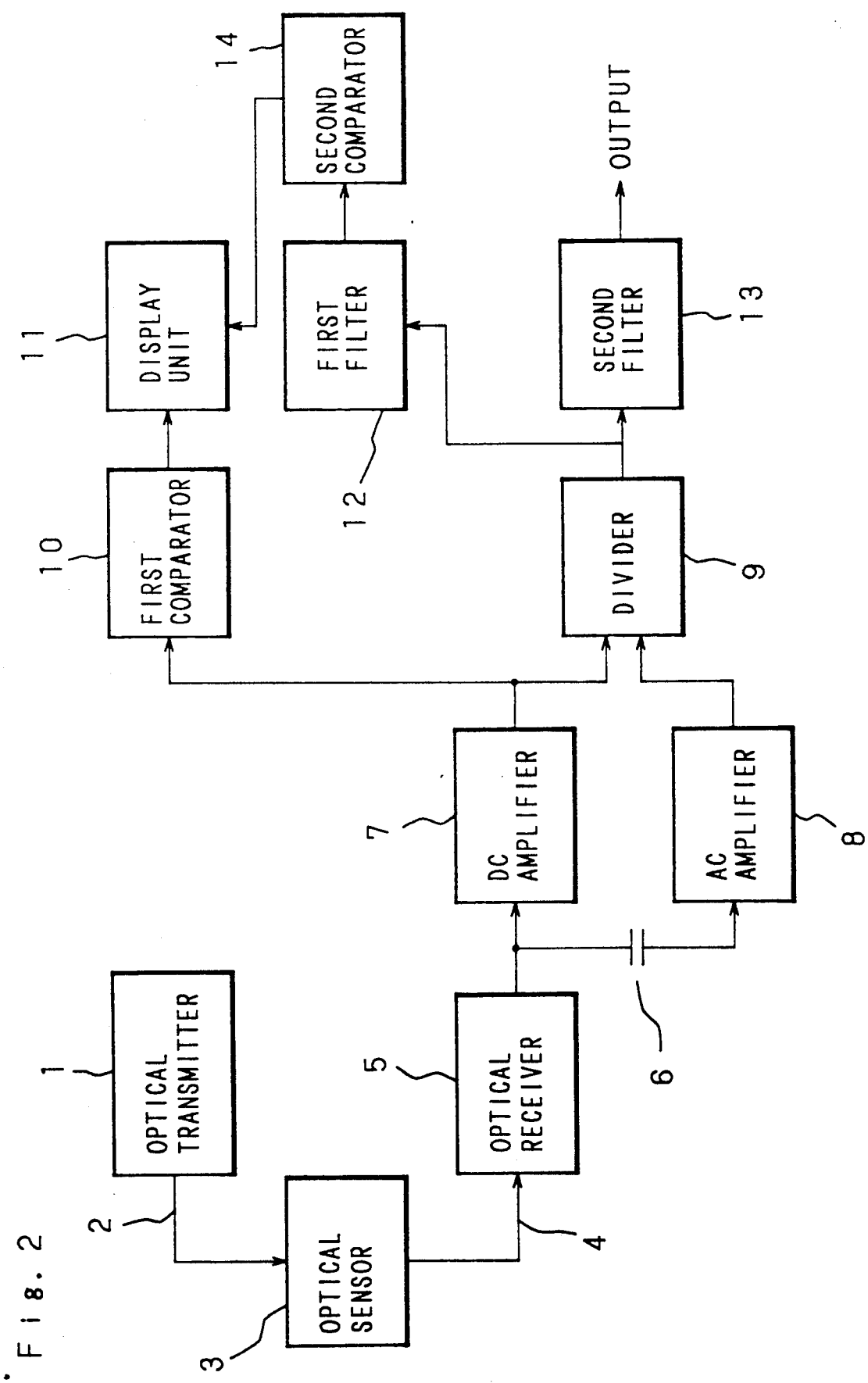

OPTICAL MEASUREMENT DEVICE

BACKGROUND OF THE INVENTION

1. Field of the Invention

This invention relates to an optical measuring apparatus which measures physical quantity by employing an optical sensor that modulates intensity of light passing therethrough.

2. Description of Related Art

FIG. 1 is a block diagram to illustrate by way of example construction of a conventional optical measuring apparatus which was disclosed in the Japanese Utility Model Application Laid Open No. 61-125783(1986). In FIG. 1, reference numeral 1 designates an optical transmitter which is driven by a direct current (DC) and supplies light to an optical sensor 3. The optical sensor 3, whose optical characteristics were changed according to physical quantity of an object of measurement connected via an optical fiber 2 to the optical transmitter 1, and modulates intensity of the light supplied from the optical transmitter 1 according to Pockels effect of Faraday effect. An optical receiver 5 which is connected via an optical fiber 4 to the optical sensor 3 receives the light from the optical sensor 3 and converts this to quantity of electricity. A condenser 6 which is connected to the optical receiver 5 removes a DC component included in output of the optical receiver 5. A DC amplifier 7 which is connected to the optical receiver 5 amplifies the DC component alone which is included in the output of the optical receiver 5. An AC amplifier 8 which is connected via the condenser 6 to the optical receiver 5 amplifies output of the condenser 6. A divider 9 which is connected to both of the DC amplifier 7 and AC amplifier 8 divides output of the AC amplifier 8 by output of the DC amplifier 7. A comparator 10 which is connected to the DC amplifier 7 compares the output of the DC amplifier 7 with a specified value. The comparator 10 is connected to a display unit 11, which displays output of the comparator 10.

Now will be described below functional operation of the conventional optical measuring apparatus shown in FIG. 1. Light Pi which was driven with the DC current by the optical transmitter 1 and transmitted via the optical fiber 2 to the optical sensor 3, in which intensity of this light is modulated according to the physical quantity of the object of measurement. Intensity of light $P_0$ modulated by the optical sensor 3 is obtained from the following formula.

$$P_0 = k \cdot Pi \cdot (1 + m) \quad (1)$$

In this formula, k·Pi designates the average intensity of the light to be received by the optical receiver 5, so does m a modulation factor of the light whose intensity was modulated according to the physical quantity W of the object of measurement, then, there can be established the following formula:

$$m = W \cdot \sin(2\pi f t) \quad (2)$$

The light Po whose intensity was modulated by the optical sensor 3 is transmitted via the optical fiber 4 to the optical receiver 5 and is converted to an electric signal. For output of the optical receiver 5, the DC amplifier 7 amplifies a DC component alone and the AC amplifier 8 amplifies an AC component alone, respectively. Output of DC amplifier 7 Vdc and output of AC amplifier 8 Vac are to be given from the following formulas, where $s_1$ is a coefficient given by multiplying a photoelectric conversion coefficient of the optical receiver 5 by an amplification rate of the DC amplifier 7, and $s_2$ is a coefficient given by multiplying the photoelectric conversion coefficient of the optical receiver 5 by an amplification rate of the AC amplifier 8.

$$Vdc = s_1 \cdot k \cdot Pi \quad (3)$$

$$Vac = s_2 \cdot k \cdot Pi \cdot m \quad (4)$$

When the output Vac of the AC amplifier 8 is divided by the output Vdc of the DC amplifier 7 by the divider 9, a signal $V_0$ to be outputted to divider 9 is obtained from the following formula:

$$\begin{aligned} V_0 &= Vac/Vdc \\ &= s_2 \cdot k \cdot Pi \cdot m / (s_1 \cdot k \cdot Pi) \\ &= s_2/s_1 \cdot m \end{aligned} \quad (5)$$

The signal $V_0$ depends only on the physical quantity of the object of measurement but not on the average intensity k·Pi of the light to be received by the optical receiver 5, accordingly, it is possible to measure the physical quantity with great accuracy.

The comparator 10 always monitors whether the level of the output of the DC amplifier 7 is below the specified value or not, and where not, the comparator 10 supplies its output to the display unit 11 to give an alarm. The value of the output of the DC amplifier 7 Vdc is in proportion to the average intensity of the light to be received by the optical receiver 5, so that the above monitoring enables the optical transmitter 1, optical fiber 2, 4, optical sensor 3, optical receiver 5 and DC amplifier 7 to self-check their malfunctions.

With the conventional optical measuring apparatus thus constructed, there has been a problem that it is impossible to self-check malfunctions in such other units as the condenser 6, AC amplifier 8 and divider 9.

SUMMARY OF THE INVENTION

The foregoing problem is dissolved in accordance with the present invention. The primary object of the present invention is to provide an optical measuring apparatus which enables a condenser, an AC amplifier and a divider to self-check their malfunctions by superimposing an AC current of a frequency higher than a frequency of physical quantity which is an object of measurement upon a DC for driving an optical transmitter and providing means for monitoring a signal component of the same frequency as the AC current which was superimposed upon the electric current for driving the optical transmitter, in output of a divider which calculated a ratio of an AC component to a DC component of output of an optical receiver.

The above and further objects and features of the invention will more fully be apparent from the following detailed description with accompanying drawings.

DESCRIPTION OF THE DRAWINGS

FIG. 2 is a block diagram to illustrate construction of an optical measuring apparatus of the present invention.

DESCRIPTION OF THE PREFERRED EMBODIMENTS

Figure 1:
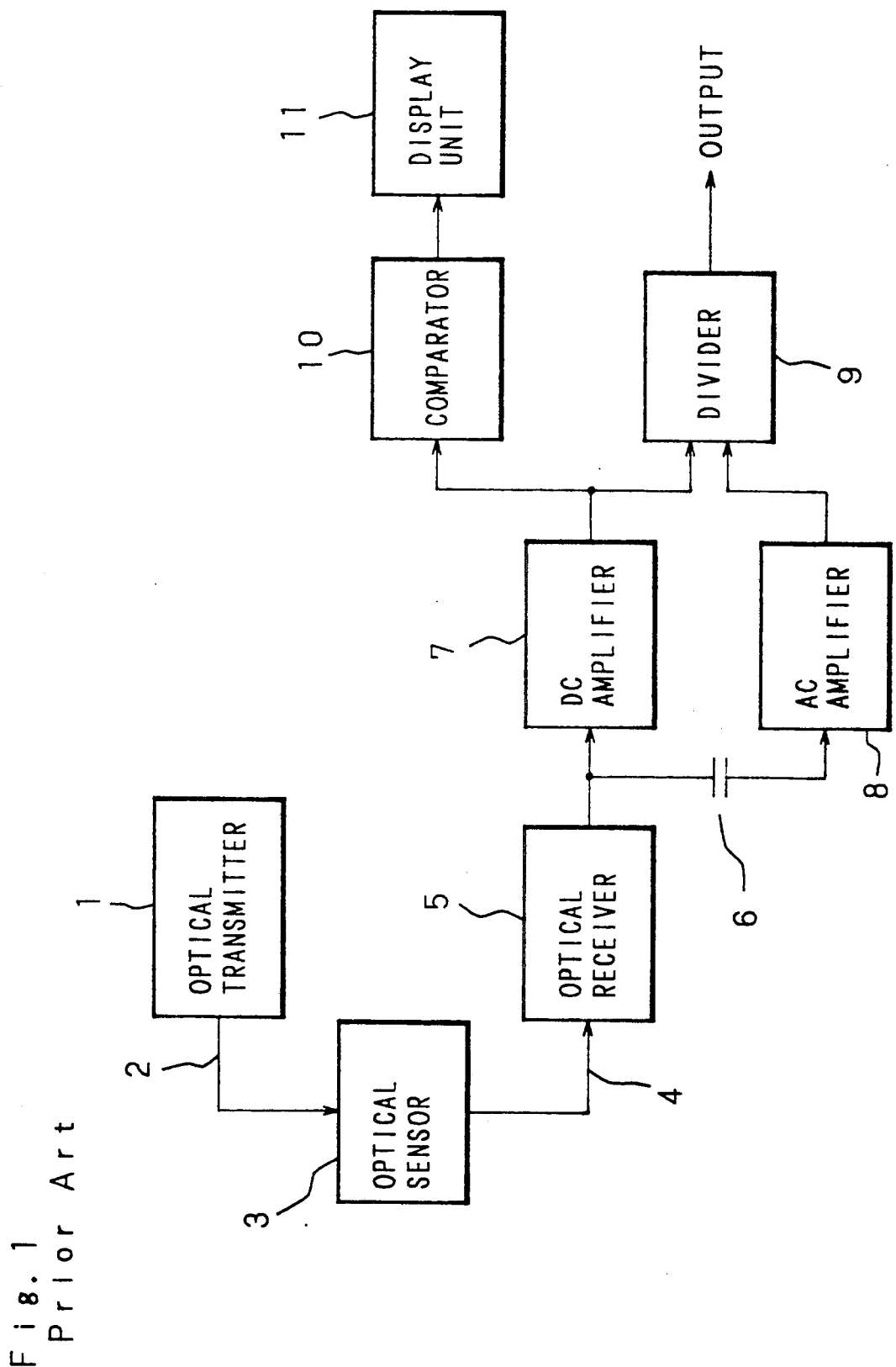
FIG. 1 is a block diagram to illustrate construction of a conventional optical measuring apparatus.

Now will be described below one embodiment of an optical measuring apparatus of the present invention with reference to the accompanying drawing.

FIG. 2 is a block diagram to illustrate construction of the optical measuring apparatus of the present invention. In FIG. 2, reference numeral 1 designates an optical transmitter, driven by a DC on which is superimposed an AC of a frequency higher than a frequency of physical quantity of an object of measurement, supplying light to an optical sensor 3. The optical sensor 3, connected via an optical fiber 2 to the optical transmitter 1, whose optical characteristics were changed according to the physical quantity of the object of measurement and modulates intensity of the light supplied from the optical transmitter 1. According to Pockels effect or Faraday effect. An optical receiver 5 which is connected via an optical fiber 4 to the optical sensor 3 receives the light from the optical sensor 3 and converts this to quantity of electricity. A condenser 6 which is connected to the optical receiver 5 removes a DC component included in output of the optical receiver 5. A DC amplifier 7 which is connected to the optical receiver 5 amplifies the DC component alone included in the output of the optical receiver 5. An AC amplifier 8 which is connected via the condenser 6 to the optical receiver 5 amplifies output of the condenser 6. A divider 9 which is connected to both of the DC amplifier 7 and AC amplifier 8 divides output of the AC amplifier 8 by output of the DC amplifier 7.

The divider 9 is connected to both of a first filter 12 which transmits only a frequency component of the superimposed AC current and a second filter which transmits only a signal component proportional to the physical quantity. A first comparator 10 which is connected to the DC amplifier 7 compares the output of the DC amplifier 7 with a specified value. The first comparator 10 is connected to a display unit 11, which display units output of the first comparator 10. A second comparator 14 which is connected to the first filter 12 always monitors output of the first filter 12, and the second comparator 14 which is connected to the display unit 11 displays an alarm on the display unit 11 when an output level of the first filter 12 is not below the specified values.

Incidentally, the DC amplifier 7, AC amplifier 8 and divider 9 form operation means, the first comparator 10 and display unit 11 form the first monitoring means, and the first filter 12, second comparator 14 and display unit 11 form the second monitoring means.

Now will be described below functional operation of one embodiment of the present invention shown in FIG. 2. When light Pc is driven by the optical transmitter 1 with the DC current which was superimposed by the AC current of a frequency $f_0$ higher than a frequency f of the physical quantity of the object of measurement, the intensity of the light Pc is obtained by the following formulas:

$$Pc = Pi \cdot (1 + m_0) \tag{6}$$

$$m_0 = W_0 \cdot \sin(2\pi f_0 t) \tag{7}$$

In the formula (6), Pi designates the average intensity of emission of the optical transmitter 1. Intensity of the light Pc which was transmitted from the optical transmitter 1 via the optical fiber 2 to the optical sensor 3 is modulated according to the physical quantity of the object of measurement. And light $P_0$ whose intensity was modulated by the optical sensor 3 is obtained by the following formula:

$$P_0 = k \cdot Pc \cdot (1 - m) \tag{8}$$

In this formula, k·Pc designates the average intensity of the light to be received by the optical receiver 5.

The light Po whose intensity was modulated by the optical sensor 3 is transmitted via the optical fiber 4 to the optical receiver 5 and is converted to an electric signal. For output of the optical receiver 5, a DC component thereof alone is amplified by the DC amplifier 7, so is an AC component alone by the AC amplifier 8. The ouput Vdc of the DC amplifier 7 and the output Vac of the AC amplifier 8 are obtained by the respective following formulas, wherein $s_1$ designates a coefficient given by multiplying a photoelectric conversion coefficient of the optical receiver 5 by an amplification rate of the DC amplifier 7, so does $s_2$ a coefficient given by multiplying the photoelectric conversion coefficient of the optical receiver 5 by an amplification rate of the AC amplifier 8.

$$Vdc = s_1 \cdot k \cdot Pi \tag{9}$$

$$Vac = s_2 \cdot k \cdot Pi \cdot (m - m_0 - m \cdot m_0) \tag{10}$$

When the output Vac of the AC amplifier 8 is divided by the output Vdc of the DC amplifier 7 in the divider 9, the value of a signal $V_0$ to be outputted from the divider 9 is obtained by the following formula:

$$\begin{aligned} V_0 &= Vac/Vdc \\ &= s_2/s_1 \cdot (m - m_0 - m \cdot m_0) \end{aligned} \tag{11}$$

Accordingly, the signal $V_0$ depends only on the physical quantity of the object of measurement but does not depend on the average intensity k·Pc of the light to be received by the optical receiver 5. In the above formula, $$\begin{aligned} m - m_0 - m \cdot m_0 &= W' \cdot \sin(2\pi f t) - W'_0 \cdot \sin(2\pi f_0 t) + \\ & \quad W' \cdot \sin(2\pi f t) \cdot W'_0 \cdot \sin(2\pi f_0 t) \\ &= W' \cdot \sin(2\pi f t) - W'_0 \cdot \sin(2\pi f_0 t) - \\ & \quad \tfrac{1}{2} \cdot W' \cdot W'_0 [\cos\{2\pi(f_0 + f)\} - \\ & \quad \cos\{2\pi(f_0 - f)\}] \end{aligned} \tag{12}$$

And signals of four kinds of frequency, f, $f_0$, $f_0+f$, and $f_0-f$ are included in the output of divider 9 $V_0$. Out of those signals, the signal of the frequency $f_0$, that is, $s_2/s_1 \cdot W_0 \cdot \sin(2\pi f_0 t)$ does not depend on the frequency or the physical quantity of the object of measurement as well as has transmitted through the condenser 6, AC amplifier 8 and divider 9. Then, it is possible to self-check malfunctions in the condenser 6, AC amplifier 8 and divider 9 by taking out only a signal component of the frequency $f_0$ by the first filter 12 and then always monitoring this signal component whether to be below the specified value or not by the second comparator 14. And when any malfunction occurs, that is, the output level of the first filter 12 is not below the specified value of the second comparator 14, the second comparator 14 allows the display unit 11 to display an alarm.

A signal proportional to the physical quantity of the object of measurement can be obtained by taking out only a signal component of the frequency f by the second filter 13.

It is not intended that a malfunction detection circuit be limited to the comparator in the above embodiment. Other suitable means, such as a microprocessor, may be employed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical measuring apparatus for measuring a physical quantity which has a frequency comprising:
    a light source driven by a direct current (DC) on which is superimposed an alternating current (AC) of a frequency higher than the frequency of said physical quantity,
    an optical sensor which modulates the intensity of the light from said light source according to said physical quantity,
    an optical receiver which converts said intensity modulated light into a quantity of electricity having a DC component and an AC component including the frequencies of the physical quantity and the superimposed AC and outputs the quantity of electricity,
    operation means for forming a ratio of the AC component to the DC component in said output of the optical receiver and for outputting a signal representative of the ratio, wherein said signal comprises a component of the same frequency as said superimposed AC,
    first monitoring means for monitoring the DC component of said output of the optical receiver, and
    second monitoring means for monitoring the signal component of the same frequency as said superimposed AC output from said operation means.

2. An optical measuring apparatus as set forth in claim 1, wherein said first monitoring means comprises means for comparing the value of the DC component of the output from said optical receiver with a specific value and means for alarming in the case where the DC component of the output of said optical receiver is different from the specified value.

3. An optical measuring apparatus as set forth in claim 1, wherein said second monitoring means comprises means for comparing the value of the signal component of the same frequency as said superimposed AC of the output from said operation means with a specific value and means for alarming in the case where the monitored signal component is above the specified value.

4. An optical measuring apparatus as set forth in claim 1, wherein said first monitoring means comprises a comparator circuit.

5. An optical measuring apparatus as set forth in claim 1, wherein said first monitoring means comprises a microprocessor.

6. An optical measuring apparatus as set forth in claim 1, wherein said second monitoring means comprises a comparator circuit.

7. An optical measuring apparatus as set forth in claim 1, wherein said second monitoring means comprises a microprocessor.

8. An optical measuring apparatus as set forth in claim 3 wherein the second monitoring means includes a filter for removing the signal component of the same frequency as said superimposed AC from said signal output from the operation means and for providing the removed signal to said means for comparing.

9. An optical measuring apparatus as set forth in claim 8, wherein said second monitoring means comprises a comparator circuit.

10. An optical measuring apparatus as set forth in claim 8, wherein said second monitoring means comprises a microprocessor.

11. An optical measuring apparatus for measuring a physical quantity which has a frequency, comprising:
    a light source driven by a direct current (DC) on which is superimposed an alternating current (AC) of a frequency higher than the frequency of said physical quantity;
    an optical sensor which modulates the intensity of the light from said light source according to said physical quantity;
    an optical receiver which converts said intensity modulated light into a quantity of electricity having a DC component and an AC component including the frequencies of the physical quantity and the superimposed AC, and outputs the quantity of the electricity;
    DC amplifier means for removing and amplifying the DC component of the output of the optical receiver;
    AC amplifier means for removing and amplifying the AC component of the output of the optical receiver;
    a divider for forming a ratio of the AC component to the DC component of the output of the optical receiver and outputting a signal representative of the ratio, wherein said signal comprises a component of the same frequency as said superimposed AC;
    a filter receiving the signal from the divider and transmitting only the signal component of the same frequency as the superimposed AC; and
    means for comparing the signal component transmitted by the filter with a specific value and means for alarming in the case where the transmitted component is above the specified value.

12. An optical measuring apparatus as set forth in claim 11, wherein said means for comparing comprises a comparator circuit.

13. An optical measuring apparatus as set forth in claim 11, wherein said means for comparing comprises a microprocessor.

14. An optical measuring apparatus for measuring a physical quantity which has a frequency, comprising:
    a light source driven by a direct current (DC) on which is superimposed an alternating current (AC) of a frequency higher than the frequency of said physical quantity;
    an optical sensor which modules the intensity of the light from said light source according to said physical quantity;
    an optical receiver which converts said intensity modulated light into a quantity of electricity having a DC component and an AC component including the frequencies of the physical quantity and the superimposed AC and outputs a quantity of electricity;

operation means for forming a ratio of the AC component to the DC component in said output of the optical receiver and outputting a signal representative of the ratio, said signal comprises a component of the same frequency of said superimposed AC; and monitoring means for receiving the signal component of the same frequency as the superimposed AC from the signal output from the operation means, and for comparing said signal component with a specific value and for providing an alarm signal when the monitored signal component is above the specified value.

15. An optical measuring apparatus as set forth in claim 14 wherein said means for receiving the signal component of the same frequency as said superimposed AC from said signal output from the operation means includes a filter for transmitting only the signal component of the same frequency as the superimposed AC.

* * * * *